(No Model.)
E. HOBBS.
GLASS GLOBE FOR ILLUMINATING PURPOSES.
No. 453,187. Patented June 2, 1891.
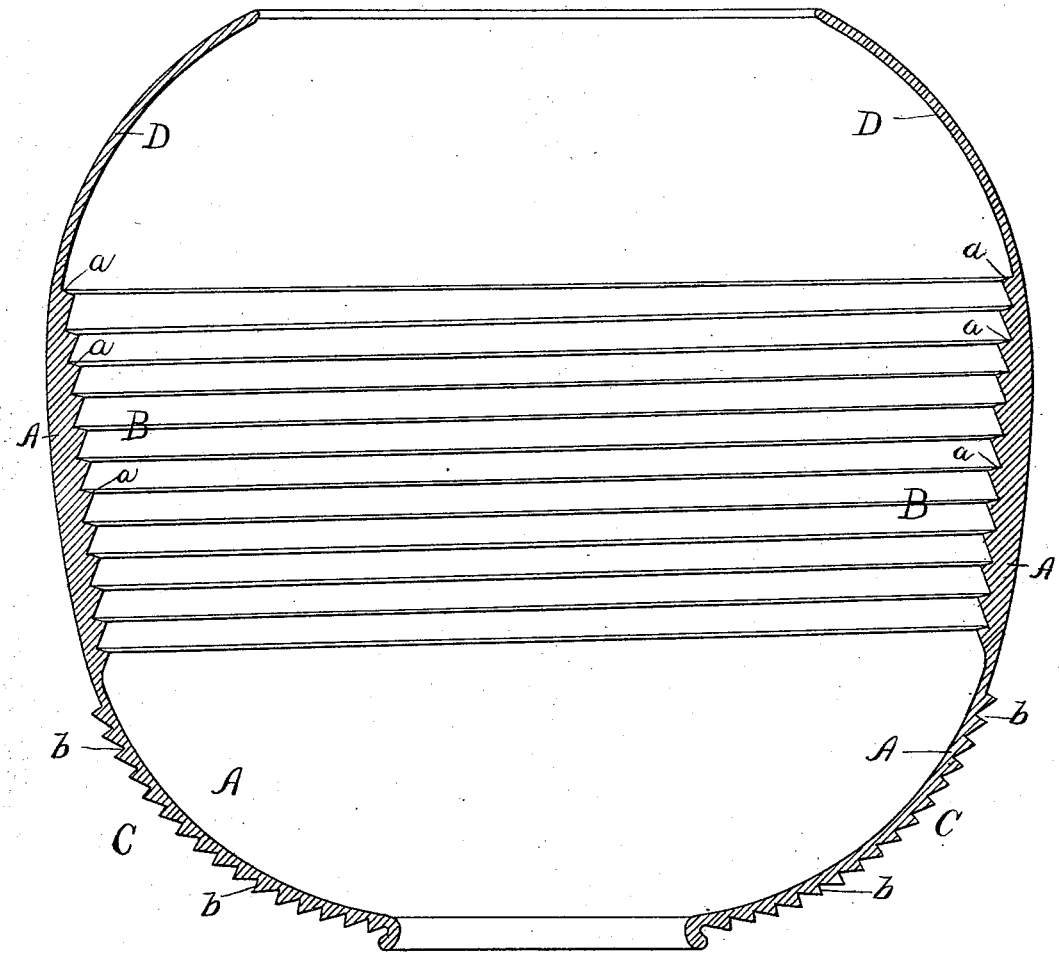
WITNESSES
A. F. Macdonald.
W. C. Ramsay.
INVENTOR
Edmund Hobbs
by Wright Brown Quisley
Attys.

UNITED STATES PATENT OFFICE.

EDWARD HOBBS, OF SALEM, MASSACHUSETTS, ASSIGNOR TO AUGUSTUS SEAVER, TRUSTEE.

GLASS GLOBE FOR ILLUMINATING PURPOSES.

SPECIFICATION forming part of Letters Patent No. 453,187, dated June 2, 1891.

Application filed May 31, 1889. Serial No. 312,728. (No model.)

*To all whom it may concern:*

Be it known that I, EDWARD HOBBS, of Salem, in the county of Essex and State of Massachusetts, have invented certain new and useful Improvements in Glass Globes for Illuminating Purposes, of which the following is a specification.

The object of my invention is to provide a glass globe for inclosing an illuminant—such as an electric arc or the flame of a gas or lamp burner—which shall diffuse the light without affecting its illuminating properties, and which will also deprive it of its dazzling qualities and materially lessen the definiteness or blackness of its shadows.

The invention consists, generally, in a glass globe having prisms or lenses formed spirally upon its body, with one surface of each of said lenses substantially at right angles to the periphery of the shade.

The accompanying drawing illustrates my improved shade in vertical section.

A is the body or base of the shade, and B is a continuous spiral prism which is formed upon that portion of the interior which is substantially vertical. One surface of this prism *a* is substantially at right angles to the body or periphery A. A similar spiral prism C, with one of its surfaces *b* substantially at right angles to the body or periphery A, is formed upon the exterior of the lower portion of the shade. In a plane transparent shade the light from an arc lamp or bright flame has a dazzling effect upon the eye; but by reason of the interior spiral B, with its surface *a* at right angles to the periphery or body A, the light is so refracted as to be considerably diffused, and this dazzling effect is overcome. The exterior spiral C will also diffuse the light from the lamp, and, by reason of its surface *b* being at right angles to the body or periphery A, the light will be so refracted and diffused as not to cast a very definite or black shadow of the supports of the lamp or any other objects obstructing said rays. The two prisms B and C, being each a continuous spiral, can be formed by a mold and screw-die, the exterior prism C being formed by a mold having an interior screw-thread and the interior prism B being formed by a die having an exterior screw-thread, the prism B being formed by a rotary screw motion of the die in the molten glass, and when the glass has sufficiently hardened said die is withdrawn by a rotary motion in the reverse direction, and the mold is removed. The upper portion D of the shade is formed after the die for forming the prism *a* has been withdrawn.

I am aware that it is not new to construct a globe having substantially vertical sides and curved ends, and also to provide a globe with prismatic reflecting-surfaces; and hence I do not make broad claim thereto.

I claim—

The herein-described improvement in globes, consisting of the globe having substantially vertical sides, an angular spiral or screw thread formed upon the interior surfaces thereof, and an angular spiral or screw thread formed upon the lower curved exterior surface, one of the sides of each of said threads lying at substantially a right angle to the adjacent inner surface of the globe, as set forth.

In testimony whereof I have signed my name to this specification, in the presence of two subscribing witnesses, this 28th day of May, A. D. 1889.

EDWARD HOBBS.

Witnesses:
  A. SEAVER,
  C. F. BROWN.